Patented Mar. 6, 1945

2,371,115

UNITED STATES PATENT OFFICE 2,371,115

SULPHANILAMIDO PYRIDAZINE

Philip Stanley Winnek, Stamford, and Richard Owen Roblin, Jr., Old Greenwich, Conn., assignors to American Cyanamid Company, New York, N. Y., a corporation of Maine No Drawing. Application November 18, 1941,
Serial No. 419,552

5 Claims. (Cl. 260—239.6)

This invention relates to a new class of chemical compounds, the sulphonamido pyridazines.

The compounds of the present invention may be represented by the following type formula:

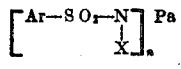

where Ar may be any aryl radical. X may be hydrogen, an alkyl group or a metal. Pa represent the pyridazine ring, represented and numbered as follows:

This ring may be substituted or unsubstituted. If unsubstituted there are two possible isomers, namely the 3 and 4 derivatives. It is possible to substitute one amino group on each of the 4 carbon atoms of the ring. Therefore there may be more than one sulphonamido group and the present invention also includes polysulphonamido pyridazines in which $n$ may be any whole number from 1 to 4.

Of particular interest in the present invention are the p-substituted benzene sulphonamido pyridazines which may be represented by the following formula:

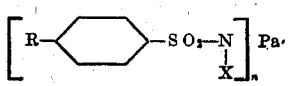

in which R may be a halogen, nitro, azo or amino group or a substituted amino group such as alkylamino, arylamino, acylamino, aralkylamino, sodium formaldehyde sulphoxylate amino or monoaldose amino and the substituents X, $n$ and Pa have the significance given above.

These compounds are useful in a number of different industrial fields. Certain of these compounds show considerable chemotherapeutic activity. The compounds having an unsubstituted amino group are valuable as intermediates for the production of azo dyes which are particularly useful in wool dyeing, making available for that purpose many useful shades obtainable with these dyes without their being subject to objectionable fading. These dyes have an extraordinary light-fastness, being substantially as resistant to fading as the chrome and metallized wool dyes. Preparation and use of such dyes is more fully set forth in our copending application, Serial No. 443,674, filed May 20, 1942.

In general compounds of the present invention may be prepared by reacting a p-substituted benzene sulphonyl halide with an amino-pyridazine. The p-substituents may be any radical capable of being converted to an amino group. For example, N-acylsulphanilyl halide when reacted with the aminopyridazine yields the corresponding acylamino compound which may be converted by hydrolysis to the amino compound; or starting with a p-nitrobenzenesulphonyl halide it is possible to obtain the p-nitrobenzene sulphonamido pyridazine which may be reduced to sulphanilamido pyridazine. Starting with a p-halogen sulphanilyl halide the resulting p-halogenamino compound produced may be converted to the corresponding sulphanilamido pyridazine by treatment with aqueous ammonia under pressure. Still another starting composition might be the p-azosulphanilyl halide compound, the azo group on the intermediate being later converted to an amino group by splitting and reduction.

In some cases the sulphanilamido pyridazines may be prepared by the action of a halogen substituted pyridazine on an N⁴-acylsulphanilamide in the presence of an alkali such as, for example, potassium carbonate. The sulphanilamidopyridazines are then obtained by hydrolysis of the acyl group.

Aminopyridazines may be prepared by reacting the corresponding halopyridazine, in a suitable solvent such as alcohol, with ammonia at an elevated temperature of about 100° C. to 200° C. The reaction is carried out under pressure in an autoclave.

Of the various starting compounds the acyl-sulphonyl compounds are perhaps the most useful as they are the most readily obtainable and the hydrolysis of the acylamino to the amino group is the simplest conversion. While any of the acylsulphonyl compounds may be used, the acetyl is preferable, again because of its relatively lower cost and greater availability.

The first step in producing any of the compounds of the present invention usually involves a reaction of sulphonyl halide with an aminopyridazine. This sets free a hydrogen halide and it is therefore desirable where a good yield is to be obtained, to provide a basic substance which will unite with the hydrogen halide evolved. This can be effected simply by carrying out the reaction in aqueous solution and adding a suitable amount of sodium hydroxide. Some organic solvents such as triethyl amine and pyridine are themselves basic, and may be used. In such cases, however, the compound of the organic base with the halogen acid is somewhat acidic and if desired more a neutral reaction mixture may be obtained by the addition of small amounts of a stronger base such as caustic alkali.

The sodium formaldehyde sulphoxylate amino compound and the mono-aldose amino compounds may be prepared from the corresponding amino compounds by a reaction with an alkali metal suloxylate solution or a mono-aldose sugar such as glucose or galactose as the case may be.

In the production of the sugar derivatives it is preferable, although not essential, to carry out the reaction in an organic solvent such as ethanol.

The invention will be described in greater detail in conjunction with the following specific examples which set forth the preparation of typical compounds falling under the present invention. The parts are by weight except in the case of liquids which are expressed in corresponding parts by volume.

EXAMPLE 1

*3-acetylsulphanilamido pyridazine*

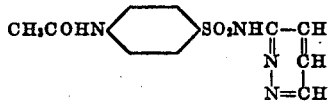

20 parts of 3-aminopyridazine were suspended in 50 parts of anhydrous pyridine and 50 parts of acetylsulphanilyl chloride were added gradually with stirring and with the temperature kept between 35° and 40° C. The reaction mixture was stirred for half an hour at 40° C. 9 parts of sodium hydroxide dissolved in 500 parts of water were added and the pyridine removed from the mixture by distillation under reduced pressure. The 3-acetylsulphanilamido pyridazine separated as a yellow solid. The product was collected by filtration and purified by crystallization from acetic acid.

EXAMPLE 2

*3-sulphanilamido pyridazine*

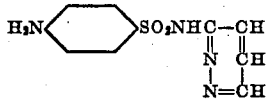

14.5 parts of 3-acetylsulphanilamido pyridazine, obtained in Example 1, in 50 parts of 10% aqueous sodium hydroxide and the solution was boiled under reflux for three-quarters of an hour. The solution was cooled and stirred in the cold with decolorizing charcoal for half an hour. The mixture was filtered and neutralized in the cold with dilute hydrochloric acid. The 3-sulphanilamido pyridazine separated as a yellow colored solid. Further product was obtained by concentration of the mother liquor. It was purified by repeated crystallization from hot water using activated charcoal to remove impurities. The product was a crystalline material.

EXAMPLE 3

*3-p-nitrobenzenesulphonamido pyridazine*

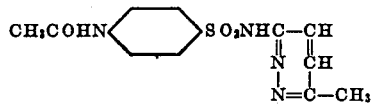

10 parts of 3-aminopyridazine were suspended in 25 parts of anhydrous pyridine and 23 parts of p-nitrobenezene sulphonylchloride were added gradually with stirring and with the temperature kept between 35° and 40° C. 4.3 parts of sodium hydroxide dissolved in 250 parts of water were added and the pyridine removed from the mixture by distillation under reduced pressure. The 3-p-nitrobenzenesulphonamido pyridazine separated as a yellow solid. It may be purified by crystallization from alcohol or acetic acid.

EXAMPLE 4

*3-sulphanilamido pyridazine*

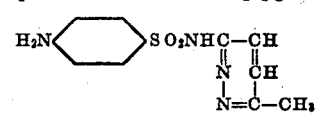

The 3-p-nitrobenezenesulphonamido pyridazine obtained in Example 3 was reduced with iron dust in dilute acetic acid solution. The iron dust was filtered out and leached with hot water. The leaching solution and filtrate were combined, neutralized and concentrated by evaporation. The product was purified by repeated recrystallization from hot water.

EXAMPLE 5

*Sodium formaldehyde sulphoxylate derivative*

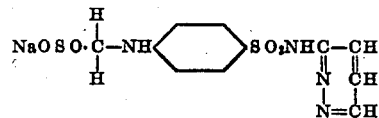

The 3-sulphanilamido pyridazine obtained in Example 2 was reacted with a slight excess of sodium formaldehyde sulphoxylate in glacial acetic acid. The product was precipitated by the addition of dry ether and collected by filtration.

EXAMPLE 6

*3-acetylsulphanilamido-6-methylpyridazine*

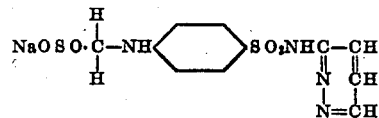

11 parts of 3-amino-6-methylpyridazine, obtained by reacting 3-chloro-6-methylpyridazine with ammonia under pressure, were suspended in 25 parts of anhydrous pyridine and 25 parts of acetylsulphanilyl chloride were added gradually with stirring and with the temperature kept between 35° and 40° C. The reaction mixture was stirred for half an hour at 40–45° C. 4.5 parts of sodium hydroxide dissolved in 200 parts of water were added and the pyridine removed from the mixture by distillation under reduced pressure. The 3-acetylsulphanilamido-6-methylpyridazine separated as a yellow solid which was purified by crystallization from acetic acid.

EXAMPLE 7

*3-sulphanilamido-6-methylpyridazine*

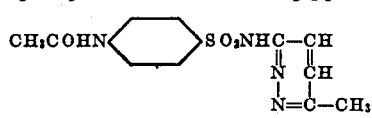

8 parts of crude 3-acetylsulphanilamido-6-methylpyridazine, obtained as in Example 6, were dissolved in 28 parts of 10% aqueous sodium hydroxide and the solution was boiled under reflux for three quarters of an hour. The solution was cooled and stirred in the cold with decolorizing charcoal for half an hour. The mixture was filtered and neutralized in the cold with dilute hydrochloric acid. The 3-sulphanilamido-6-methylpyridazine separated as a yellow colored solid. Further product was obtained by concentration of the mother liquor. It was purified by repeated crystallization from hot water using activated charcoal to remove impurities.

EXAMPLE 8

*3-acetylsulphanilamido-6-phenylpyridazine*

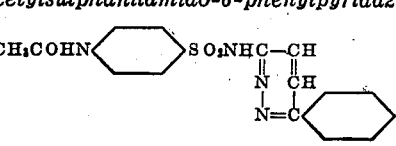

17 parts of 3-amino-6-phenylpyridazine, obtained by reacting 3-chloro-6-phenylpyridazine with ammonia under pressure, were suspended in 25 parts of anhydrous pyridine and 25 parts of acetylsulphanilyl chloride were added gradually with stirring and with the temperature kept between 40-45° C. The reaction mixture was stirred for half an hour at 40-50° C. 4.5 parts of sodium hydroxide dissolved in 200 parts of water were added and the pyridine removed from the mixture by distillation under reduced pressure. The 3-acetylsulphanilamido-6-phenylpyridazine precipitated as a light colored solid. It was purified by crystallization from acetic acid.

Example 9

*3-sulphanilamido-6-phenylpyridazine*

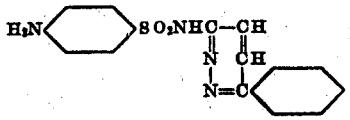

9 parts of crude 3-acetylsulphanilamido-6-phenylpyridazine, obtained as in Example 8 were dissolved in 25 parts of 10% aqueous sodium hydroxide and the solution boiled under reflux for three quarters of an hour. The solution was cooled and stirred with activated charcoal for one-half hour. The mixture was filtered and the filtrate neutralized in the cold with dilute hydrochloric acid. The 3-sulphanilamido-6-phenyl-pyridazine separated as a light colored solid. It was purified by crystallization from aqueous alcohol rising activated charcoal to remove impurities.

Example 10

*3-acetylsulphanilamide-4,5,6-trimethyl pyridazine*

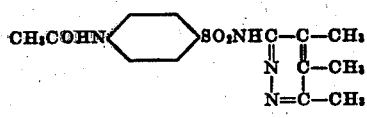

14 parts of 3-amino-4,5,6-trimethyl pyridazine, obtained by reacting 3-chloro-4,5,6-trimethylpyridazine with ammonia under pressure, were suspended in 25 parts of anhydrous pyridine and 25 parts of acetylsulphanilyl chloride were added gradually with stirring and with the temperature maintained at 40-45° C. The reaction mixture was stirred for one-half hour at 40-50° C. 4.5 parts of sodium hydroxide dissolved in 200 parts of water were added and the pyridine removed from the mixture by distillation under reduced pressure. The 3-acetylsulphanilamido-4,5,6-trimethylpyridazine separated as a light colored solid.

Example 11

*3-sulphanilamido-4,5,6-trimethylpyridazine*

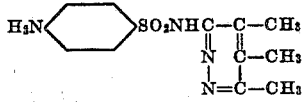

8 parts of 3-acetylsulphanilamide-4,5,6-trimethylpyridazine were dissolved in 25 parts of 10% sodium hydroxide and the solution boiled under reflux for three quarters of an hour. The solution was cooled and stirred with activated charcoal for 15 minutes. The mixture was filtered and the filtrate neutralized in the cold with dilute hydrochloric acid. The 3-sulphanilamido-4,5,6-trimethylpyridazine separated as a light colored solid. It was purified by crystallization from hot water using activated charcoal to remove impurities.

The hydrogen of the sulphonamide group in the compounds of the examples is capable of reacting with strong bases to form salts. The alkali metal salts can be produced directly by a reaction of the compounds with an alkali metal hydroxide in concentrated aqueous solution. The salt can then be precipitated by adding an excess of solid alkali hydroxide and recrystallized from absolute alcohol.

Salts of the heavy metals such as gold, copper, iron, and the like, can be obtained by a reaction of an aqueous solution of the alkali metal salts with a solution of the desired heavy metal salt. The salts of the heavy metals are either insoluble or have such a low degree of solubility that they readily precipitate out of the solution.

We claim:

1. A p-substituted benzene sulphonamido pyridazine having the following formula:

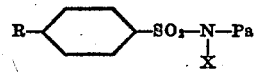

where R represents a member of the group consisting of the azo and amino radicals, X is a member of the group consisting of hydrogen, alkyl and metals, and Pa represents a pyridazine selected from the group consisting of pyridazine, alkyl-substituted pyridazines and aryl-substituted pyridazines, the bond being to a carbon atom in the ring.

2. A p-sulphanilamido pyridazine having the following formula:

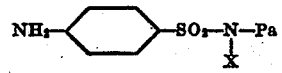

where X is a member of the group consisting of hydrogen, alkyl and metals and Pa represents a pyridazine selected from the group consisting of pyridazine, alkyl-substituted pyridazines and aryl-substituted pyridazines, the bond being to a carbon atom in the ring.

3. As a new compound 3-sulphanilamido pyridazine.

4. A method of preparing 3-sulphanilamido pyridazine which comprises reacting 3-aminopyridazine with a p-X-benzenesulphonyl halide where X is selected from the group consisting of acylamino, nitro, halogen, and azo radicals, in the presence of a compound capable of reacting with the hydrogen halide to form salts and of converting the p-X-benzenesulphonamido pyridazine to 3-sulphanilamido pyridazine by subjecting it to a reaction selected from the group consisting of reduction, hydrolysis and reaction with ammonia.

5. In a method of preparing p-substituted benbenesulphonamido pyridazine, the pyridazine radical being selected from the group consisting of pyridazine, alkyl-substituted pyridazines and aryl-substituted pyridazines, the improvement which comprises the step of reacting an amino pyridazine with X-benzenesulphonyl halide where X is selected from the group consisting of acylamino, nitro, halogen and azo radicals in an organic solvent in the presence of a sufficient amount o falkali metal hydroxide to neutralize the hydrogen halide evolved by the reaction.

PHILIP STANLEY WINNEK.
RICHARD OWEN ROBLIN, Jr.

CERTIFICATE OF CORRECTION.

Patent No. 2,371,115. March 6, 1945.

PHILIP STANLEY WINNEK, ET AL.

It is hereby certified that error appears in the printed specification of the above numbered patent requiring correction as follows: Page 1, second column, line 57, for "suloxylate" read --sulphoxylate--; page 3, second column, line 60, claim 5, for "benesulphonamido" read --zenesulphonamido--; and that the said Letters Patent should be read with this correction therein that the same may conform to the record of the case in the Patent Office.

Signed and sealed this 14th day of August, A. D. 1945.

(Seal)

Leslie Frazer
First Assistant Commissioner of Patents.